US010316140B2

(12) United States Patent
Sipos et al.

(10) Patent No.: US 10,316,140 B2
(45) Date of Patent: Jun. 11, 2019

(54) POLYESTERS COMPRISING 2,5-FURANDICARBOXYLATE AND SATURATED DIOL UNITS HAVING A HIGH GLASS TRANSITION TEMPERATURE

(71) Applicants: Furanix Technologies B.V., Amsterdam (NL); Roquette Frères, Lestrem (FR)

(72) Inventors: Laszlo Sipos, Amsterdam (NL); Gerardus Johannes Maria Gruter, Amsterdam (NL); Jeffrey John Kolstad, Amsterdam (NL); Gabriel Degand, Lambres (FR); Nicolas Jacquel, Lambersart (FR); René Saint-Loup, Lomme (FR); Matheus Adrianus Dam, Amsterdam (NL); Joseph D. Schroeder, Minneapolis, MN (US)

(73) Assignees: Furanix Technologies B.V., Amsterdam (NL); Roquette Freres, Lestrem (FR)

( * ) Notice: Subject to any disclaimer, the term of this patent is extended or adjusted under 35 U.S.C. 154(b) by 0 days.

(21) Appl. No.: 15/127,596

(22) PCT Filed: Mar. 23, 2015

(86) PCT No.: PCT/NL2015/050186
§ 371 (c)(1),
(2) Date: Sep. 20, 2016

(87) PCT Pub. No.: WO2015/142181
PCT Pub. Date: Sep. 24, 2015

(65) Prior Publication Data
US 2017/0129994 A1    May 11, 2017

Related U.S. Application Data

(60) Provisional application No. 61/968,474, filed on Mar. 21, 2014.

(30) Foreign Application Priority Data

Mar. 21, 2014    (NL) .................................... 2012489

(51) Int. Cl.
*C08G 63/672*    (2006.01)
*C08G 63/78*    (2006.01)

(52) U.S. Cl.
CPC ........... *C08G 63/672* (2013.01); *C08G 63/78* (2013.01)

(58) Field of Classification Search
CPC ...... C08G 63/85; C08G 63/181; C08G 63/60; C08G 63/668; C08G 63/80; C08G 63/672
See application file for complete search history.

(56) References Cited

U.S. PATENT DOCUMENTS

| 8,420,769 B2 | 4/2013 | Eritate |
| 2004/0092703 A1* | 5/2004 | Germroth ............ C08G 63/672 528/298 |
| 2011/0118390 A1 | 5/2011 | Feron et al. |
| 2011/0282020 A1 | 11/2011 | Sipos |
| 2013/0095269 A1 | 4/2013 | Carman, Jr. et al. |
| 2013/0171397 A1 | 7/2013 | Ghosh et al. |

FOREIGN PATENT DOCUMENTS

| EP | 1882712 B1 | 4/2010 |
| WO | 2010/010282 A1 | 1/2010 |
| WO | 2013/034743 A1 | 3/2013 |
| WO | 2013/062408 A1 | 5/2013 |
| WO | 2014/100257 A2 | 6/2014 |

OTHER PUBLICATIONS

Hui, Y.H., et al.; Handbook of Food Science, Technology, and Engineering, vol. 2, 2006, p. 62-2 to 62-3.*
Fenouillot et al; Progress in Polymer Science, 2010, vol. 35, p. 578-622.*
Gomes et al; Journal of Polymer Science Part A: Polymer Chemistry, 2011, vol. 49, p. 3759-3768.*
Fletcher et al. 1, 4, 3, 6-Hexitol dianhydride, I-isoidide, J. Am Chem. Soc., 1945, 67, 1042-3.
Lavilla, et al., Bio-based poly(butylene terephthalate) copolyesters containing bicyclic diacetalized galactitol and galactaric acid: Influence of composition on properties, Polymer 2012, 53 (16), 3432-3445.
Lavilla, et al., Bio-Based Aromatic Polyesters from a Novel Bicyclic Diol Derived from D-Manitol Macromolecules, 2012, 45, 8257-8266.
Montgomery, et al., 1, 4, 3, 6-dianhydro-I-iditol and the structure of isomannide and isosorbide, J. Am. Chem. Soc., 1946, 68, 939-41.

* cited by examiner

*Primary Examiner* — Robert S Jones
(74) *Attorney, Agent, or Firm* — Hoffmann & Baron, LLP

(57) ABSTRACT

A polyester including at least one furandicarboxylate unit, at least one saturated, linear or branched, diol unit including from 2 to 10 carbon atoms, and at least one bicyclic diol unit, the said bicyclic diol being chosen from: isosorbide, isoidide, isomannide, 2,3:4,5-di-O-methylene-galactitol, and 2,4:3,5-di-O-methylene-D-mannitol. The glass transition temperature of the polyester is greater than or equal to 90° C. Processes for preparing this polyester are also described.

26 Claims, 1 Drawing Sheet

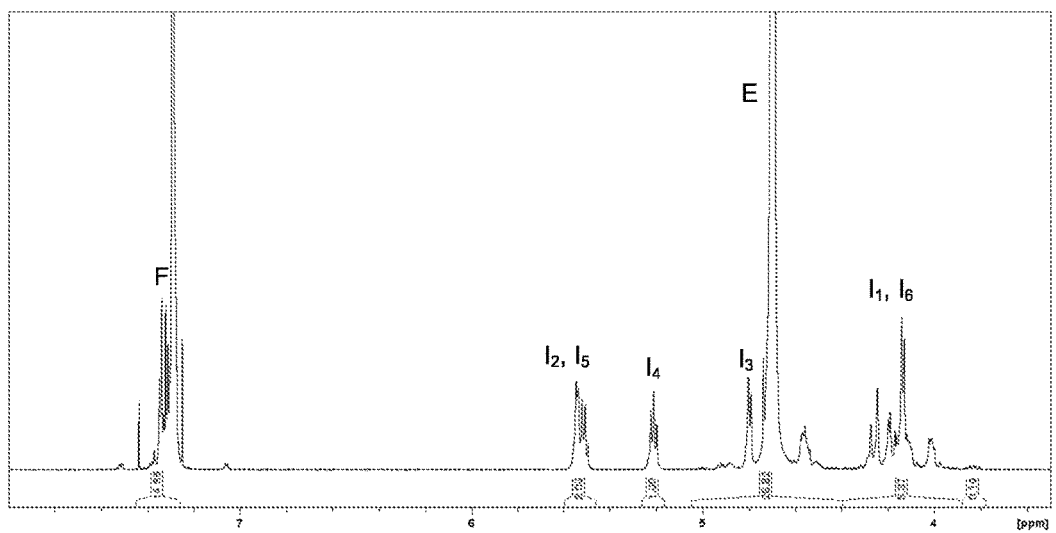
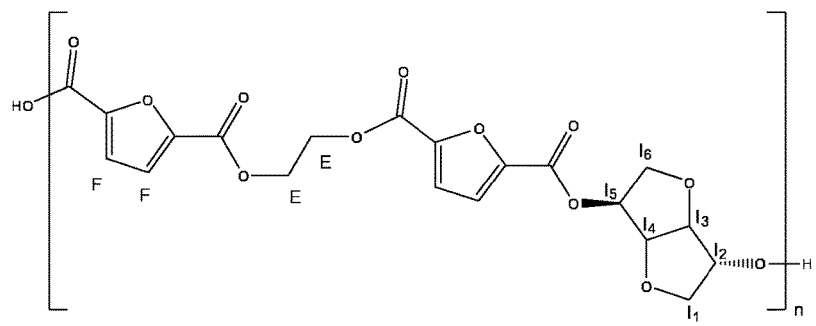
$^1$H NMR Spectrum of Example 3

POLYESTERS COMPRISING 2,5-FURANDICARBOXYLATE AND SATURATED DIOL UNITS HAVING A HIGH GLASS TRANSITION TEMPERATURE

CROSS-REFERENCE TO RELATED APPLICATIONS

This application is the National Stage of International Application No. PCT/NL2015/050186 filed Mar. 23, 2015, which claims the benefit of U.S. Provisional Application No. 61/968,474, filed Mar. 21, 2014, and the benefit of Netherlands Application No. NL 2012489, filed Mar. 21, 2014, the contents of all of which are incorporated by reference herein.

FIELD OF THE INVENTION

The present invention relates to polyesters, comprising 2,5-furandicarboxylate and saturated diol units, having a high glass transition temperature. Another subject-matter of the invention is a process for the manufacture of the said polyester and the use of this polyester in the manufacture of compositions and articles.

TECHNOLOGICAL BACKGROUND OF THE INVENTION

Due to their many advantages, plastics have become inescapable in the mass production of objects. Aromatic polyesters, such as polyethyleneterephthalate (PET), which is a polyester comprising ethylene glycol and terephthalic acid units, are used, for example, for the manufacture of containers, packagings or textile fibres.

The term "monomer units" is understood to mean, according to the invention, units included in the polyester, which units can be obtained after polymerization of a monomer. As regards the ethylene glycol and terephthalic acid units included in PET, they can either be obtained by an esterification reaction of ethylene glycol and terephthalic acid or by a transesterification reaction of ethylene glycol and terephthalic acid ester.

The development of polyesters resulting from biological resources renewable in the short term has become an ecological and economic imperative, in the face of the exhaustion and of the increase in costs of fossil resources, such as oil. One of the main concerns today in the field of polyesters is thus that of providing polyesters of natural origin (biosourced polyesters). Thus, groups such as Danone or Coca-Cola are today marketing drink bottles made of partially biosourced PET, this PET being manufactured from biosourced ethylene glycol. A disadvantage of this PET is that it is only partially biosourced since the terephthalic acid, for its part, results from fossil resources. Although polyesters comprising biosourced terephthalic acid have already been described, for example in Application WO 2013/034743 A1, the processes for the synthesis of biosourced terephthalic acid or biosourced terephthalic acid ester remain too expensive to date for completely biosourced PET to currently experience commercial success.

Other aromatic polyesters, comprising monomer units other than terephthalic acid units, have been manufactured in order to replace PET.

Among biosourced polyesters, aromatic polyesters comprising 2,5-furandicarboxylate units constitute an advantageous alternative as these polyesters exhibit mechanical, optical and thermal properties similar to those of PET.

These polyesters have been described in various documents. Patent Application US 2011/0282020 A1 describes in particular a process for the manufacture of a polyester comprising 2,5-furandicarboxylate units in which:

in a first stage, a 2,5-furandicarboxylic acid ester is reacted with a polyol in the presence of a transesterification catalyst comprising Sn(IV), in order to form a prepolymer;

then, at reduced pressure, in a second stage, the prepolymer thus formed is polymerized in the presence of a polycondensation catalyst comprising Sn(II) in order to increase the molar mass thereof and to form a polyester.

This process makes it possible to manufacture polyesters of high molecular weight and low coloration, without requiring a stage of purification after synthesis.

However, the Applicants were able to find that, for some applications or under some conditions of use, these polyesters did not exhibit all the required properties. This is, for example, the case for applications requiring that the polyester exhibit a high glass transition temperature. By way of example, when it is desired to fill, under hot conditions, bottles formed of polyester, it is desirable for the glass transition temperature to be as high as possible, in order for the bottle to retain its shape during the filling. Other examples of applications in which it is necessary to have such polyesters having a high glass transition temperature are the articles intended to be placed close to heat sources, as is the case, for example, with headlamps or bulbs which emit heat when they are used. This is because it is necessary to retain the dimensional stability of these objects over time; in point of fact, the higher the glass transition temperature, the better the dimensional stability in the event of exposure of the article to heat.

The document US 20130095269 A1 for its part describes, in a general manner, copolyesters comprising 2,5-furandicarboxylate and ethylene glycol units and at least one additional glycol. The use of additional glycol does not make it possible to increase the glass transition temperature. This is because, contrary to polyesters of PET type, where the glass transition temperature is increased (see Examples 4 and 5), the use of an additional glycol in polyesters comprising 2,5-furandicarboxylate and saturated diol units reduces their glass transition temperature (Examples 1 and 2). These polyesters are obtained by a synthetic process using, as monomer, 2,5-furandicarboxylic acid (FDCA).

The document US 20130171397 A1 describes the manufacture of polyesters comprising 2,5-furandicarboxylate units. Among these various polyesters, polyesters of 2,5-furandicarboxylic acid and ethylene glycol (PEF) and also copolyesters of 2,5-furandicarboxylic acid and a mixture of glycols consisting of ethylene glycol and bicyclic diol—more particularly isosorbide—(PEIF) are synthesized. The introduction of a bicyclic diol does not make it possible to increase the glass transition temperature since that of PEF is 79° C. while that of the polyesters comprising bicyclic diol units is at the very most 78° C. (see Table 4). These polyesters are obtained by a synthetic process using, as monomer, 2,5-furandicarboxylic acid.

It can thus be concluded, from the teachings of these two documents, that the use of glycols to modify a polyester comprising 2,5-furandicarboxylate and saturated diol units, in particular the use of a bicyclic diol, does not make it possible to increase the glass transition temperature of this polyester.

There thus still exists a need to obtain novel polyesters which can be partially or completely biosourced and which exhibit an improved glass transition temperature.

In the context of their research studies, the Applicants have succeeded in improving the thermal properties of polyesters comprising 2,5-furandicarboxylate and saturated diol units, the said saturated diol being linear or branched, and in thus obtaining a polyester having a higher glass transition temperature. Unexpectedly and contrary to what is taught in the prior art, they have succeeded in obtaining this novel polyester by using a bicyclic diol, starting from a specific process described in the continuation of the description.

SUMMARY OF THE INVENTION

A subject-matter of the invention is thus a polyester comprising:
at least one furandicarboxylate unit,
at least one saturated, linear or branched, diol unit comprising from 2 to 10 carbon atoms,
and at least one bicyclic diol unit, the said bicyclic diol unit being chosen from:

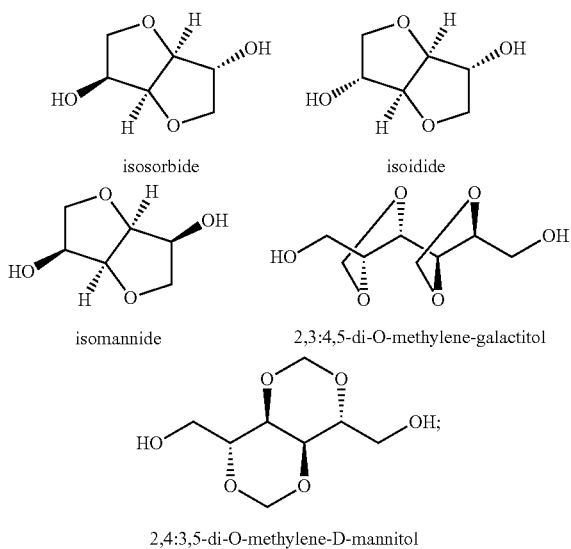

the said polyester exhibiting a glass transition temperature of greater than or equal to 90° C.

As is shown in the examples of the present patent application, the polyester according to the invention can be obtained by using a furandicarboxylic acid diester as starting monomer, in a specific manufacturing process which comprises:
  a stage of introduction, into a reactor, of monomers comprising at least one furandicarboxylic acid diester, one saturated, linear or branched, diol comprising from 2 to 10 carbon atoms and one bicyclic diol chosen from the abovementioned bicyclic diols, in order to form a reaction medium;
  a stage of polymerization of the monomers in the presence of at least one catalyst, in order to form a polyester;
  a stage of recovery of the polyester on conclusion of the polymerization stage;
and in which the (total diol)/diester molar ratio ranges from 1.7 to 2.6, for example from 1.85 to 2.4.

An alternative method for preparing the polyester according to the invention comprises reacting at least one furandicarboxylic acid or diester, and at least one bicyclic diol chosen from the above-mentioned bicyclic diols in order to form a ester product comprising an excess of furandicarboxylate moieties compared to bicyclic diol moieties; and reacting the ester product thus obtained with a saturated, linear or branched, diol comprising from 2 to 10 carbon atoms under polymerization conditions to form the polyester.

A further alternative process comprises:
  reacting, suitably in a first reactor, at least one furandicarboxylic acid or diester, and at least one bicyclic diol chosen from the abovementioned bicyclic diols in order to form a ester product comprising an excess of furandicarboxylate moieties compared to bicyclic diol moieties;
  reacting, suitably in a second reactor, at least one furandicarboxylic acid or diester, at least one saturated, linear or branched, diol comprising from 2 to 10 carbon atoms to form an oligomer of furandicarboxylate units and saturated, linear or branched, diol units; and
  reacting the ester product, suitably from the first reactor, with the oligomer, suitably from the second reactor, under polymerization conditions to form the polyester.

The ester products produced in the alternative methods can be oligomers comprising more furandicarboxylate units than diol units, but can also comprise single compounds, consisting of two furandicarboxylate units bound to one diol unit.

DESCRIPTION OF FIGURES

FIG. 1 represents 1H NMR spectrum and the chemical structure of a poly(ethylene-co-isosorbide furanoate) according to the invention.

DETAILED DESCRIPTION OF THE INVENTION

The polyester according to the invention comprises:
at least one furandicarboxylate unit,
at least one saturated, linear or branched, diol unit comprising from 2 to 10 carbon atoms,
and at least one bicyclic diol unit.

The furandicarboxylate unit can be a 2,5-furandicarboxylate unit, a 2,4-furandicarboxylate unit, a 2,3-furandicarboxylate unit, a 3,4-furandicarboxylate unit or a mixture of these units. Preferably, the furandicarboxylate unit is the 2,5-furandicarboxylate unit.

More specifically, the term "2,5-furandicarboxylate unit" denotes, in the present patent application, a unit of formula:

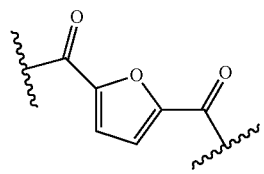

the zigzags denoting the bonds via which the unit is connected to the remainder of the polyester, whatever the monomer used to form the said unit.

The furandicarboxylic acid or diester can be biosourced. One route to obtaining the furandicarboxylic acid is the oxidation of disubstituted furans, for example 5-hydroxymethylfurfural or 5-(methoxymethyl)furfural.

The term "saturated, linear or branched, diol unit" denotes, in the present invention, a unit of formula:

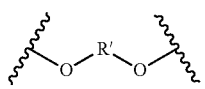

the aliphatic group R' being a saturated, linear or branched, aliphatic group, the zigzags denoting the bonds via which the unit is connected to the remainder of the polyester, whatever the monomer used to form the said unit. Preferably, the saturated diol unit is a saturated linear diol unit.

They can be chosen from ethylene glycol, 1,2-propanediol, 1,3-propanediol, 1,4-butanediol, 1,5-pentanediol, 1,6-hexanediol, 1,8-octanediol, 1,10-decanediol and a mixture of these diols, preferably ethylene glycol and 1,4-butanediol, very preferably ethylene glycol. Advantageously, the bicyclic diol unit is a dianhydrohexitol unit which can be chosen from the isosorbide, isoidide and isomannide units and a mixture of these units.

Preferably, the dianhydrohexitol unit is chosen from the isosorbide and isoidide units. Very preferably, the dianhydrohexitol unit is an isosorbide unit.

The isosorbide, the isomannide and the isoidide can thus be respectively obtained by dehydrating sorbitol, mannitol and iditol.

The synthesis of these dianhydrohexitols is well known: different routes are described, for example, in the papers by Fletcher et al. (1,4,3,6-*Hexitol dianhydride, I-isoidide, J. Am. Chem. Soc.*, 1945, 67, 1042-3 and also 1,4,3,6-*dianhydro-I-iditol and the structure of isomannide and isosorbide, J. Am. Chem. Soc.*, 1946, 68, 939-41), by Montgomery et al. (*Anhydrides of polyhydric alcohols. IV. Constitution of dianhydrosorbitol, J. Chem. Soc.*, 1946, 390-3 and *Anhydrides of polyhydric alcohols. IX. Derivatives of* 1,4-*anhydrosorbitol from* 1,4,3,6-*dianhydrosorbitol, J. Chem. Soc.*, 1948, 237-41), by Fleche et al. (*Isosorbide. Preparation, properties and chemistry, Starch/Staerke*, 1986, 38, 26-30) and by Fukuoka et al. (*Catalytic conversion of cellulose into sugar alcohols, Angew. Chem. Int. Ed.*, 2006, 45, 5161-3), and in U.S. Pat. No. 3,023,223.

For its part, the 2,3:4,5-di-O-methylene-galactitol can be obtained by acetalization and then reduction of galactaric acid, as described by Lavilla et al. in *Bio-based poly (butylene terephthalate) copolyesters containing bicyclic diacetalized galactitol and galactaric acid: Influence of composition on properties, Polymer*, 2012, 53(16), 3432-3445. For its part, the 2,4:3,5-di-O-methylene-D-mannitol can be obtained by acetalization of D-mannitol by formaldehyde, as described by Lavilla et al. in *Bio-Based Aromatic Polyesters from a Novel Bicyclic Diol Derived from D-Mannitol, Macromolecules*, 2012, 45, 8257-8266.

The polyester advantageously comprises, with respect to the sum of the units resulting from saturated, linear or branched, diol and from bicyclic diol, at least 5 mol % of bicyclic diol units, advantageously at least 10%. Advantageously, this amount is less than or equal to 50%, preferably less than or equal to 30%. In these amounts and very especially in the preferred amounts, the polyester exhibits a particularly high glass transition temperature while exhibiting excellent optical and mechanical properties.

The amounts of each of the different units in the polyester can be determined by $^1$H NMR.

The man skilled in the art would easily find the conditions of analysis to determine the amount of each of the different units in the polyester. For example and as shown in FIG. 1, in the case of poly(ethylene-co-isosorbide furanoate), the chemical shift relative to the signal of ethylene glycol unit is between 4.60 and 4.80 ppm, the chemical shift relative to the signal of furandicarboxylate unit is between 7.25 and 7.5 ppm and the chemical shifts relative to the signals of isosorbide are around 4.15, 4.8 ppm, 5.2 ppm and 5.55 ppm. The integration of each signal is made to determine the quantity of each constitutive unit in the polyester.

According to one form of the invention, the polyester according to the invention comprises, with respect to the total amount of the units:
  from 40% to 60% of furandicarboxylate units;
  from 5% to 55% of saturated, linear or branched, diol units;
  from 5% to 55% of bicyclic diol units.

The polyester according to the invention can comprise additional monomer units other than the furandicarboxylate, saturated, linear or branched, diol and bicyclic diol units. Preferably, the amount of additional monomer units is, with respect to the total sum of the units of the polyester, less than 30%, very preferably less than 10%. The polyester according to the invention can be devoid of additional monomer unit.

The additional monomer units can in particular contain diether units, such as diethylene glycol units. These diether units can originate from co-products of the polymerization process, that is to say that they can originate, for example, from an etherification reaction between two glycols. In order to limit this esterification reaction, it is possible to add, to the reactor, a base which limits this phenomenon, it being possible for the said base to be sodium acetate, sodium hydroxide, tetramethylammonium hydroxide, tetraethylammonium hydroxide or a mixture of these bases. Preferably, the amount of diether units is, with respect to the total sum of the units of the polyester, less than 10%. The polyester according to the invention can be devoid of diether unit. Other ethers units containing diols are described in U.S. Pat. No. 8,420,769.

The additional monomer units can also be additional diacid units other than the furandicarboxylate units. By way of example, these units can be saturated aliphatic diacid units. Mention may be made, as saturated cyclic aliphatic diacid unit, of the 1,4-cyclohexanedioic acid unit. Advantageously, the aliphatic diacid unit is a saturated linear aliphatic diacid unit. These units can be chosen from the succinic acid, glutaric acid, adipic acid, pimelic acid, suberic acid, azelaic acid or sebacic acid units or a mixture of these diacids. Preferably, the aliphatic diacid is chosen from succinic acid and adipic acid, very preferably succinic acid. Also concerned may be aromatic diacid units, such as a terephthalic acid unit. Preferably, the amount of additional diacid units is, with respect to the total sum of the units of the polyester, less than 30%, very preferably less than 10%. The polyester according to the invention can be devoid of additional diacid unit. If the polyester contains an additional monomer unit and the additional monomer unit is an aromatic diacid unit, it is suitably not a 2,6-naphthalene dicarboxylic acid unit, and preferably is a terephthalic acid unit.

The additional monomer units can also be hydroxy acid units. By way of example, the hydroxy acid units can be glycolic acid, lactic acid, hydroxybutyric acid, hydroxycaproic acid, hydroxyvaleric acid, 7-hydroxyheptanoic acid, 8-hydroxyoctanoic acid, 9-hydroxynonanoic acid, hydroxymethylfurancarboxylic acid or hydroxybenzoic acid units or a mixture of these hydroxy acids. As regards these hydroxy acid units, they are capable of being obtained from a hydroxy acid or a dilactone, such as glycolide or lactide. Preferably, the amount of hydroxy acid units is, with respect to the total sum of the units of the polyester, less than 10%. The polyester according to the invention can be devoid of hydroxy acid unit.

The polyester according to the invention can also comprise chain-extending units. The term "chain-extending unit" is understood to mean a unit capable of being obtained by a monomer comprising two functional groups other than the hydroxyl, carboxylic acid and carboxylic acid ester functional groups and capable of reacting with these same functional groups. The functional groups can be isocyanate, isocyanurate, caprolactam, caprolactone, carbonate, epoxy, oxazoline and imide functional groups, it being possible for the said functional groups to be identical or different. Mention may be made, as chain extenders which can be used in the present invention, of:
- diisocyanates, preferably methylenediphenyl diisocyanate (MDI), isophorone diisocyanate (IPDI), dicyclohexylmethane diisocyanate (H12MDI), toluene diisocyanate (TDI), naphthalene diisocyanate (NDI), hexamethylene diisocyanate (HMDI), lysine diisocyanate (LDI) or the aliphatic diisocyanate with a molar mass of 600 g/mol obtained from fatty diacid dimers (DDI®1410 Diisocyanate),
- dimers of diisocyanates,
- "isocyanate-free" prepolymers resulting from a reaction of a diol or of an amine with a diisocyanate under conditions such that the prepolymer comprises an isocyanate functional group at each of its ends (α,ω-functional or telechelic polymer) without free diisocyanate being able to be detected,
- di(alkyl carbonate)s, in particular dianhydrohexitol di(alkyl carbonate)s and especially isosorbide di(alkyl carbonate)s,
- dicarbamoylcaprolactams, preferably 1,1'-carbonylbis-caprolactam, or dicarbamoylcaprolactones,
- diepoxides,
- compounds comprising an epoxide functional group and a halide functional group, preferably epichlorohydrin,
- heterocyclic compounds, preferably bis-oxazolines, bis-oxazolin-5-ones and bis-azalactones,
- derivatives of methylenic or ethylenic diesters, preferably derivatives of methyl or ethyl carbonates,
- any mixture of at least any two of the abovementioned products.

Preferably, the amount of chain-extending units is, with respect to the total sum of the units of the polyester, less than 10%. The polyester according to the invention can be devoid of chain-extending unit.

The monomer units can also be polyfunctional units. The term "polyfunctional unit" refers to a unit which can be obtained by reaction of a comonomer capable of reacting with the hydroxyl and/or carboxylic acid and/or carboxylic acid ester functional groups and which has a functionality of greater than 2. The reactive functional groups of these branching agents can be hydroxyl, carboxylic acid, isocyanate, isocyanurate, caprolactam, caprolactone, carbonate, epoxy, oxazoline and imide functional groups, it being possible for the said functional groups to be identical or different, preferably carboxylic acid, hydroxyl, epoxide or isocyanate, very preferably carboxylic acid or hydroxyl. The functionality of these branching agents can be from 3 to 6, preferably from 3 to 4. Mention may be made, among the branching agents conventionally used, of: malic acid, citric or isocitric acid, tartaric acid, trimesic acid, tricarballylic acid, cyclopentanetetracarboxylic acid, glycerol, pentaerythritol, dipentaerythritol, monoanhydrosorbitol, monoanhydromannitol, epoxidized oils, dihydroxystearic acid, trimethylolpropane, ethers of these polyols, such as, for example, glycerol propoxylate (sold under the name of Voranol 450 by Dow Chemical), polymers exhibiting side epoxide functional groups, triisocyanates, tetraisocyanates and also the respective homopolymers of existing di-, tri- and tetraisocyanates, trimers and tetramers of diisocyanate, polyanhydrides or alkoxysilanes, preferably tetraethoxysilane.

Preferably, the amount of polyfunctional units is, with respect to the total sum of the units of the polyester, less than 10%. The polyester according to the invention can be devoid of polyfunctional unit.

According to another form of the invention, the polyester according to the invention comprises, with respect to the total amount of the units:
- from 40% to 60% of furandicarboxylate units;
- from 5% to 55% of saturated, linear or branched, diol units;
- from 5% to 55% of bicyclic diol units;
- from 0% to 10% of diether units;
- from 0% to 30% of additional diacid units other than furandicarboxylate, preferably from 0% to 10%;
- from 0% to 10% of hydroxy acid units;
- from 0% to 10% of chain-extending units;
- from 0% to 10% of polyfunctional units.

The polyester according to the invention can be partially biosourced, indeed even completely biosourced. In other words, it is obtained, in all or in part, from at least partially biosourced monomers.

The polyester can be a random copolymer or a block copolymer.

The polyester according to the invention advantageously exhibits a weight-average molar mass of greater than 7500 g/mol, preferably of greater than 10 000 g/mol, very preferably of greater than 15 000 g/mol.

The molar mass of the polyester can be determined by conventional methods, such as, for example, by size exclusion chromatography (SEC) in a mixture of chloroform and 1,1,1,3,3,3-hexafluoro-2-propanol (in a volume ratio 98/2). The signal can then be detected by a differential refractometer calibrated with polymethyl methacrylate standards.

The polyester according to the invention exhibits a glass transition temperature of greater than or equal to 90° C., preferably of greater than or equal to 95° C. The glass transition temperature of the polyester can be measured by conventional methods, in particular by using differential scanning calorimetry (DSC) using a heating rate of 10 K/min. The protocol is detailed in the analytical methods below.

The polyester according to the invention advantageously exhibits, according to the Lab method, an index $b^*$ of less than 20 and a ratio $L^*/b^* > 1.6$.

The invention also relates to a process for the manufacture of polyester, which can make it possible to manufacture the polyester according to the invention, the said process comprising:
- a stage of introduction, into a reactor, of monomers comprising at least one 2,5-furandicarboxylic acid diester, one saturated, linear or branched, diol comprising from 2 to 10 carbon atoms and one bicyclic diol, in order to form a reaction medium;
- a stage of polymerization of the monomers in the presence of a catalyst, in order to form a polyester;
- a stage of recovery of the polyester on conclusion of the polymerization stage;

the (saturated diol+bicyclic diol)/diester molar ratio ranging from 1.7 to 2.6, advantageously from 1.85 to 2.4, for example from 1.9 to 2.1.

This process makes it possible to obtain a polyester exhibiting a higher glass transition temperature than that of a polyester obtained from an identical process except that no bicyclic diol is used.

As regards the monomers introduced into the reactor, they can be introduced in one go or in several goes into the reactor, in the form of a mixture or separately.

According to the process of the invention, the monomers introduced into the reactor comprise at least one 2,5-furandicarboxylic acid diester, one saturated, linear or branched, diol comprising from 2 to 10 carbon atoms and one bicyclic diol.

The saturated, linear or branched, diols and the bicyclic diols of use in the process of the invention have been described above in the corresponding polyester units parts.

As regards the furandicarboxylic acid diester which forms the furandicarboxylate unit, it is preferably a dialkyl furandicarboxylate. According to the furandicarboxylate unit desired for the polyester, use is made of the corresponding diester. In order to form a 2,5-furandicarboxylate unit, the diester of use in the process of the invention is a 2,5-furandicarboxylic acid diester. It can suitably be chosen from dimethyl furandicarboxylate or diethyl furandicarboxylate, preferably methyl furandicarboxylate.

As regards the additional monomer units, they can be obtained from the monomers mentioned as units of the polyester.

As regards the monomers mentioned which comprise carboxylic acid functional groups, it is possible to replace them with monomers different solely in that the carboxylic acid functional group of the monomer is replaced by a carboxylic acid ester functional group. Use may be made, by way of example, of the alkyl succinate in order to form the succinic acid unit. Preferably, use is made, in order to form the additional diacid units, of dicarboxylic acid dialkyl esters, such as succinic acid dialkyl esters, glutaric acid dialkyl esters, adipic acid dialkyl esters, pimelic acid dialkyl esters, suberic acid dialkyl esters, azelaic acid dialkyl esters and sebacic acid dialkyl esters. Preferably, the dicarboxylic acid dialkyl esters, in particular those mentioned, are dimethyl esters.

It should be specified that, during a condensation reaction, not all the monomers and in particular not all the diols necessarily react in the reactor and a portion of these monomers may be evaporated during the reaction, which results in losses of monomer. Thus, as regards the bicyclic diol, the losses are generally slightly greater than those of the other monomers. However, an advantage of the process according to the invention is that the overall losses in bicyclic diols are low, that is to say that the ratio between molar percentage of bicyclic diol units in the polymer and molar percentage of bicyclic diol in the reactor feed can be higher or equal to 0.85, preferably higher or equal to 0.90. The exact amounts of each of the monomers to be introduced into the reactor are easily determined by a person skilled in the art.

Advantageously, with respect to all of the moles of monomers introduced into the reactor, the molar percentage of 2,5-furandicarboxylic acid diester ranges from 20% to 50%, advantageously ranges from 25% to 40%, preferably ranges from 27% to 35%.

It is preferred for the process according to the invention, that, with respect to all of the moles of saturated, linear or branched, diol and bicyclic diols introduced into the reactor, at least 5 mol % and at most 99 mol % are composed of bicyclic diol, in particular at least 7 mol % and at most 80 mol %, for example at least 9 mol % and at most 40 mol %.

The process according to the invention comprises a polymerization stage in the presence of a catalyst. Use may be made of catalysts based on titanium, zirconium, tin, antimony, hafnium, bismuth, lithium, cerium, germanium, zinc, cobalt, manganese, iron, aluminium, magnesium, calcium, strontium, sodium or potassium or a mixture of these catalysts.

According to an alternative form of the process, the polymerization stage of the process comprises:
 a first stage, referred to as transesterification stage, during which the reaction medium is stirred at a temperature ranging from 100 to 220° C., advantageously from 150 to 210° C., preferably from 180 to 200° C., in order to form oligomers;
 a second stage, referred to as polycondensation stage, during which the oligomers formed are stirred at a temperature ranging from 180 to 260° C., advantageously from 200 to 255° C., in order to form the polyester.

According to this alternative form, the first stage has a duration preferably ranging from 1 to 5 hours and the second stage has a duration preferably ranging from 2 to 6 hours.

Preferably, the first stage is carried out under an inert gas atmosphere. Prior to the first stage, a stage of deoxygenation of the reactor is preferably carried out. It can be carried out, for example, by producing a vacuum in the reactor and by then introducing an inert gas, such as nitrogen, into the reactor. This vacuum/introduction of inert gas cycle can be repeated on several occasions, for example from 3 to 5 times. Preferably, this vacuum-nitrogen cycle is carried out at a temperature between 60 and 80° C. in order for the reactants, in particular the bicyclic diols, to be completely molten. This deoxygenation stage exhibits the advantage of improving the coloration properties of the polyester obtained at the end of the process.

Use is advantageously made, during this stage, of a transesterification catalyst. This transesterification catalyst can be chosen from derivatives of tin, preferably tin(IV), titanium, zirconium, hafnium, zinc, manganese, calcium or strontium or a mixture of these catalysts. Examples of such compounds can, for example, be those given in US2011282020A1 in sections [0026] to [0029], and on page 5 of WO 2013/062408 A1.

Preferably, use is made, during the first transesterification stage, of a zinc derivative, tin(IV) derivative, a titanium derivative or a manganese derivative.

At the end of transesterification, the catalyst of the first stage can optionally be blocked by the addition of phosphorous acid or phosphoric acid, or else, as in the case of tin(IV), be reduced by phosphites, such as triphenyl phosphite or tris(nonylphenyl) phosphite or those mentioned in section [0034] of US2011282020A1.

The second polycondensation stage can optionally be carried out with the addition of an additional catalyst. This catalyst is advantageously chosen from derivatives of tin, preferably tin(II), titanium, zirconium, germanium, antimony, bismuth, hafnium, magnesium, cerium, zinc, cobalt, iron, manganese, calcium, strontium, sodium, potassium, aluminium or lithium or a mixture of these catalysts. Examples of such compounds can, for example, be those given in EP 1 882 712 B1 in sections [0090] to [0094].

Preferably, the catalyst is a tin(II), titanium or antimony derivative.

This stage can be carried out under vacuum, preferably at a pressure of less than 10 mbar, very preferably of less than 1 mbar.

The process according to the invention comprises a stage of recovery of the polyester on conclusion of the polymerization stage. The polyester can be recovered by extracting it from the reactor in the form of a string of molten polymer. This string can be converted into granules using conventional granulation techniques.

In an alternative process of the invention the bicyclic diol is contacted with the furandicarboxylic acid or diester. Suitably the molar ratio of bicyclic diol to furandicarboxylic acid or diester is in the range of 1:1.5 to 1:3. It is preferred to have at least a stoichiometric excess of furandicarboxylic acid diester to form a compound comprising one bicyclic diol moiety for two furandicarboxylate moieties. Therefore, the molar ratio of bicyclic diol to furandicarboxylic acid or diester is preferably in the range of 1:2 to 1:2.5. In order to optimise the formation of the desired compound of two furandicarboxylate moieties and one bicyclic diol moiety, any alcohol that stems from the starting diester, when used, is suitably removed from the reaction medium. When de diester is used, the reaction preferably takes place in the presence of a transesterification catalyst, such as those mentioned hereinabove. The reaction temperature may be ranging from 100 to 220° C., advantageously from 150 to 210° C., preferably from 180 to 200° C. The duration of this contact preferably ranges from 1 to 8 hours. When a furandicarboxylic acid is used as monomer, a (trans)esterification catalyst is not required.

The ester product is subsequently reacted with the saturated diol with 2 to 10 carbon atoms under polymerization conditions. These conditions suitably include a temperature in the range of 180 to 260° C., advantageously from 200 to 255° C., a pressure of less than 10 mbar, very preferably of less than 1 mbar and a reaction period of 2 to 6 hours. Additional and/or alternative catalysts may be added, similar to those mentioned for the polycondensation step mentioned above. The polyester that can then be recovered has a very high Tg.

In a modification of this alternative process an ester product of furandicarboxylate and bicyclic diol is prepared as described above, suitably in a first reactor. In parallel therewith, suitably in a second reactor, the saturated diol having 2 to 10 carbon atoms is reacted with furandicarboxylic acid or diester to form an oligomer of furandicarboxylate and the saturated diol. In the latter reaction suitably an excess of saturated diol is used. Thus, the molar ratio of saturated diol to furandicarboxylic acid or diester is suitably in the range of 1:2 to 1:4, preferably, 1:2.1 to 1:3. When the reaction is performed with a diester as monomer, this reaction is also suitably carried out in the presence of a transesterification catalyst as described above. The catalyst may be the same or different in case there are two transesterifications. The reaction between the saturated diol and the furandicarboxylic acid or diester, e.g. in the second reactor, suitably takes place at a temperature in the range from 100 to 220° C., advantageously from 150 to 210° C., preferably from 180 to 200° C. The duration of this contact preferably ranges from 1 to 5 hours. The result of this reaction is an oligomer comprising one or more furandicarboxylate units and saturated diol units. The oligomer will have saturated diol end groups.

In a subsequent step the ester product of furandicarboxylate and bicyclic diol, as produced in e.g. the first reactor and oligomer, as produced in e.g. the second reactor, are subjected to polymerization. Advantageously, the polymerization takes place is two sub-steps. In a first sub-step the ester product and the oligomer are contacted at a temperature in the range of 100 to 220° C., advantageously from 150 to 210° C., preferably from 180 to 200° C. The contact period may suitably vary from 1 to 5 hours. During this contact some transesterification is believed to take place, whereby the furandicarboxylic end group of the ester products transesterifies with the saturated diol end group of the oligomer. All reactions described herein are preferably performed in an inert atmosphere. The resulting product is then subjected to polycondensation, preferably under the conditions that were described above for the polycondensation reaction, i.e. include a temperature in the range of 180 to 260° C., advantageously from 200 to 255° C., a pressure of less than 10 mbar, very preferably of less than 1 mbar, and a reaction period of 2 to 6 hours. Then the polyester can be recovered, having a high glass transition temperature.

The process according to the invention can also comprise, after the stage of recovery of the polyester, a stage of polymerization in the solid state. A stage of polymerization in the solid state is carried out at a temperature lower than the softening point of the polyester. It can be carried out, for example, on the granules described above. This stage can be carried out at a temperature reaching, indeed even exceeding, 180° C., for example exceeding 190° C. This stage can be carried out under vacuum and/or in the presence of inert gases. It is preferable for the polyester obtained to be semicrystalline in order to carry out this stage of polymerization in the solid state.

The invention also relates to the polyester capable of being obtained by the process according to the invention.

Another subject-matter of the invention is a composition comprising the polyester according to the invention and at least one compound chosen from additives or polymers.

The composition according to the invention can thus comprise, as additive, nucleating agents. These nucleating agents can be organic or inorganic in nature. Examples of nucleating agents are talc, calcium silicate, sodium benzoate, calcium titanate, boron nitride, zinc salts, porphyrins, chlorin and phlorin.

The composition according to the invention can also comprise, as additive, nanometric or non-nanometric and functionalized or non-functionalized fillers or fibres of organic or inorganic nature. They can be silicas, zeolites, glass fibres or beads, clays, mica, titanates, silicates, graphite, calcium carbonate, carbon nanotubes, wood fibres, carbon fibres, polymer fibres, proteins, cellulose fibres, lignocellulose fibres and nondestructured granular starch. These fillers or fibres can make it possible to improve the hardness, the stiffness or the permeability to water or to gases. The composition can comprise from 0.1% to 75% by weight, for example from 0.5% to 50% by weight, of fillers and/or fibres, with respect to the total weight of the composition. The composition can also be of composite type, that is to say can comprise large amounts of these fillers and/or fibres.

The additive of use in the composition according to the invention can also comprise opacifying agents, dyes and pigments. They can be chosen from cobalt acetate and the following compounds: HS-325 Sandoplast® Red BB, which is a compound carrying an azo functional group also known under the name Solvent Red 195, HS-510 Sandoplast® Blue 2B, which is an anthraquinone, Polysynthren® Blue R and Clariant® RSB Violet.

The composition can also comprise, as additive, a processing aid for reducing the pressure in the processing device. A mould-release agent, which makes it possible to reduce the adhesion to the equipment for shaping the polyester, such as the moulds or the rollers of calendering devices, can also be used. These agents can be selected from fatty acid esters and amides, metal salts, soaps, paraffins or hydrocarbon waxes. Specific examples of these agents are zinc stearate, calcium stearate, aluminium stearate, stearamide, erucamide, behenamide, beeswax or Candelilla wax.

The composition according to the invention can also comprise other additives, such as stabilizers, for example light stabilizers, UV stabilizers and heat stabilizers, fluidifying agents, flame retardants and antistats. It can also comprise primary and/or secondary antioxidants. The primary antioxidant can be a sterically hindered phenol, such as the compounds Hostanox® 0 3, Hostanox® 0 10, Hostanox® 0 16, Ultranox® 210, Ultranox®276, Dovernox® 10, Dovernox® 76, Dovernox® 3114, Irganox® 1010 or Irganox® 1076. The secondary antioxidant can be trivalent phosphorous-comprising compounds, such as Ultranox® 626, Doverphos® S-9228 or Sandostab® P-EPQ.

In addition, the composition can comprise an additional polymer other than the polyester according to the invention. This polymer can be chosen from polyamides, polyesters other than the polyester according to the invention, polystyrene, styrene copolymers, styrene/acrylonitrile copolymers, styrene/acrylonitrile/butadiene copolymers, polymethyl methacrylates, acrylic copolymers, poly(ether/imide)s, polyphenylene oxides, such as poly(2,6-dimethylphenylene oxide), polyphenylene sulfide, poly(ester/carbonate)s, polycarbonates, polysulphones, polysulphone ethers, polyetherketones and the blends of these polymers.

The composition can also comprise, as additional polymer, a polymer which makes it possible to improve the impact properties of the polymer, in particular functional polyolefins, such as functionalized polymers and copolymers of ethylene or propylene, core/shell copolymers or block copolymers.

The compositions according to the invention can also comprise polymers of natural origin, such as starch, cellulose, chitosans, alginates, proteins, such as gluten, pea proteins, casein, collagen, gelatin or lignin, it being possible or not for these polymers of natural origin to be physically or chemically modified. The starch can be used in the destructured or plasticized form. In the latter case, the plasticizer can be water or a polyol, in particular glycerol, polyglycerol, isosorbide, sorbitans, sorbitol, mannitol or also urea. Use may in particular be made, in order to prepare the composition, of the process described in the document WO 2010/010282 A1.

The composition according to the invention can be manufactured by conventional methods for the conversion of thermoplastics. These conventional methods comprise at least one stage of melt or softened blending of the polymers and one stage of recovery of the composition. This process can be carried out in internal blade or rotor mixers, an external mixer, or single-screw or corotating or counterrotating twin-screw extruders. However, it is preferable to carry out this blending by extrusion, in particular by using a corotating extruder. The blending of the constituents of the composition can be carried out at a temperature ranging from 220 to 300° C., preferably under an inert atmosphere.

In the case of an extruder, the various constituents of the composition can be introduced using introduction hoppers located along the extruder.

The invention also relates to an article comprising the polyester or the composition according to the invention.

This article can be of any type. It can advantageously be used close to a heat source, for example at less than 20 cm. The heat source can have a temperature exceeding 30° C., indeed even 40° C. The article exhibits the advantage of retaining excellent dimensional stability and good resistance to light, even close to light and heat sources, for example close to headlamps or bulbs.

This article can in particular be a receptacle, it being possible for this receptacle to be used for hot filling.

This article can be manufactured from the composition or polyester according to the invention using conventional conversion techniques.

For example, fibres or yarns of use in the textile industry or other industries may be concerned. These fibres or yarns can be woven, in order to form fabrics, or also nonwoven.

The article according to the invention can also be a film or a sheet. These films or sheets can be manufactured by calendering, cast film extrusion or film blowing extrusion techniques. These films can be used for the manufacture of labels or insulators.

The article according to the invention can also be a receptacle for transporting gases, liquids and/or solids. The receptacles concerned may be baby's bottles, flasks, bottles, for example sparkling or still water bottles, juice bottles, soda bottles, carboys, alcoholic drink bottles, medicine bottles or bottles for cosmetic products, dishes, for example for ready-made meals or microwave dishes, or also lids. These receptacles can be of any size. They can be manufactured by extrusion-blow moulding, thermoforming or injection-blow moulding.

These articles can also be optical articles, that is to say articles requiring good optical properties, such as lenses, discs, transparent or translucent panels, optical fibres, films for LCD screens or also window panes. These optical articles exhibit the advantage of being able to be placed close to light sources and thus heat sources, while retaining excellent dimensional stability and good resistance to light.

The articles can also be multilayer articles, at least one layer of which comprises the polymer or the composition according to the invention. These articles can be manufactured by a process comprising a coextrusion stage in the case where the materials of the different layers are brought into contact in the molten state. Mention may be made, by way of example, of the tube coextrusion technique, the profile coextrusion technique, the bottle or tank coextrusion-blow moulding technique, generally grouped together under the term of the hollow body coextrusion-blow moulding technique, the blown film coextrusion technique, also known as the coextrusion-film blowing technique, and the cast coextrusion technique.

They can also be manufactured according to a process comprising a stage of application of a layer of polyester in the molten state to a layer based on organic polymer, on metal or on adhesive composition in the solid state. This stage can be carried out by pressing, overmoulding, lamination, extrusion-lamination, coating or extrusion-coating.

The invention will now be illustrated in the examples below. It is specified that these examples do not in any way limit the present invention.

Analytical Methods:

The polymer molar mass was assessed by size exclusion chromatography (SEC) in a mixture of chloroform and 1,1,1,3,3,3-hexafluoro-2-propanol (98:2 vol %). Samples of 1 g·L$^{-1}$ were eluted at a flow rate of 0.75 mL·min$^{-1}$. The signals were then detected with a RI detector (Agilent-RI-1100a). The average molar masses (Mn and Mw) were determined with a calibration method using polymethylmethacrylate standards.

The reduced viscosity ($\eta_{red}$) the polymers was determined with an automated Ubbelohde capillary at 25° C. Polymer samples were dissolved at 135° C. for 15 to 25 min in a mixture of phenol/ortho-dichlorobenzene (50:50 wt %, Aldrich France) at a concentration of $C_1$=0.5 g·L$^{-1}$. Subsequently, the reduced viscosity was calculated according to the following equation ($t_0$ and $t_s$ refer to neat solvent and polymer-solvent solution flow times, respectively):

$$\eta_{red} \text{ (mL.g}^{-1}\text{)} = \frac{t_s - t_o}{t_0 \times C_1}$$

The coloration of the polymer was measured on polymer pellets with a spectrophotometer Konica Minolta CM-2300d.

The thermal properties of the PBS were measured on differential scanning calorimeter (DSC). Under nitrogen atmosphere, the polymer sample was first heated from 10 to 280° C. (10° C.min$^{-1}$), cooled to 10° C. (10° C.min$^{-1}$) and reheated in the same conditions as in the first step. The glass transition of the polymer was taken at midpoint during the second heating.

The $^1$H NMR analysis of polyesters samples was carried out by using a 400 MHz Brucker liquid state NMR spectrometer equipped with a QNP probe. The 15 mg of the polymer sample was solved in 0.6 mL of CDCI$_3$ (deuterated chloroform) and 0.1 mL of d1-TFA (deuterated tetrafluoro acetic acid).

EXAMPLES

This invention is further illustrated by the following non-limiting examples:

Example 1. Synthesis of poly(ethylene-co-isosorbide furanoate) Polyester According to the Invention In a 200 mL glass reactor were added 50.0 g of dimethyl-2,5-furanedicarboxylate (0.27 mol), 27.0 g of ethylene glycol (0.43 mol), 15.8 g of isosorbide (0.11 mol) and 0.08 g of titanium tetrabutoxide. The temperature was increased to 160° C. at a constant stirring of 150 rpm under nitrogen flow. The temperature was hold for 1 hour and then further increased to 190° C. The trans-esterification rate was estimated from the quantity of distillate collected. In the second step, the pressure was reduced to 5 mbar in 90 min and the temperature was gradually increased to 240° C. Low pressure conditions were maintained for 210 min.

The resulting polyester had a reduced viscosity of 26.2 mL/g (25° C., 5 g/L, Phenol: 1,2-dichlorobenzene (50:50)). The chemical analysis of the PEIF by NMR gave an isosorbide content of 19.8 mol % regarding to the diol content. The molar mass of the polymer was Mn=9 600 g/mol and Mw=33 800 g/mol with a PDI=3.5. The analysis by DSC gave a glass transition of the polymer at 94° C. The color parameters measured on the polymer pellets were L*=28.8, a*=3.4 and b*=11.4. The ratio between molar percentage of bicyclic diol units in the polymer and molar percentage of bicyclic diol in the reactor feed, hereafter $R_{P/F}$, was 0.97.

Comparative Example 1. Synthesis of poly(ethylene-co-isosorbide furanoate)

In a 200 mL glass reactor were added 50.0 g of dimethyl-2,5-furanedicarboxylate (0.27 mol), 20.2 g of ethylene glycol (0.33 mol), 11.9 g of isosorbide (0.08 mol) and 0.08 g of titanium tetrabutoxide. The temperature was increased to 160° C. at a constant stirring of 150 rpm under nitrogen flow. The temperature was hold for 1 hour and then further increased to 190° C. The trans-esterification rate was estimated from the quantity of distillate collected. In the second step, the pressure was reduced to 5 mbar in 90 min and the temperature was gradually increased to 240° C. Low pressure conditions were maintained for 210 min.

The resulting polyester had a reduced viscosity of 14.2 mL/g (25° C., 5 g/L, Phenol: 1,2-dichlorobenzene (50:50)). The chemical analysis of the PEIF by NMR gave an isosorbide content of 16.4 mol % regarding to the diol content. The molar mass of the polymer was Mn=4 600 g/mol and Mw=17 100 g/mol with a PDI=3.7. The analysis by DSC gave a glass transition of the polymer at 87° C. $R_{P/F}$ was 0.84.

Comparative Example 2. Synthesis of poly(ethylene-co-isosorbide furanoate)

In a 200 mL glass reactor were added 50.0 g of dimethyl-2,5-furanedicarboxylate (0.27 mol), 40.5 g of ethylene glycol (0.65 mol), 23.8 g of isosorbide (0.16 mol) and 0.08 g of titanium tetrabutoxide. The temperature was increased to 160° C. at a constant stirring of 150 rpm under nitrogen flow. The temperature was hold for 1 hour and then further increased to 190° C. The trans-esterification rate was estimated from the quantity of distillate collected. In the second step, the pressure was reduced to 5 mbar in 90 min and the temperature was gradually increased to 240° C. Low pressure conditions were maintained for 210 min.

The resulting polyester had a reduced viscosity of 13.2 mL/g (25° C., 5 g/L, Phenol: 1,2-dichlorobenzene (50:50)). The chemical analysis of the PEIF by NMR gave an isosorbide content of 25 mol % regarding to the diol content. The molar mass of the polymer was Mn=5 050 g/mol and Mw=15 250 g/mol with a PDI=3.0. The analysis by DSC gave a glass transition of the polymer at 83° C. $R_{P/F}$ was 1.27.

Comparative Example 3. Synthesis of poly(ethylene-co-isosorbide furanoate)

In a 200 mL glass reactor were added 50.0 g of furandicarboxylic acid (0.32 mol), 25.3 g of ethylene glycol (0.41 mol), 10.5 g of isosorbide (0.07 mol) and 0.315 g of antimony oxide. The reacting mixture was then processed according to Example 7 of document US 2013/0171397 A1.

The resulting polyester had a reduced viscosity of 21.7 mL/g (25° C., 5 g/L, Phenol: 1,2-dichlorobenzene (50:50)). The chemical analysis of the PEIF by NMR gave an isosorbide content of 14.6 mol % regarding to the diol content. The molar mass of the polymer was Mn=14 900 g/mol and Mw=26 750 g/mol with a PDI=1.8. The analysis by DSC gave a glass transition of the polymer at 80° C. The color parameters measured on the polymer pellets were L*=27.8, a*=1.3 and b*=8.8. $R_{P/F}$ was 1.00.

Comparative Example 4. Synthesis of poly(ethylene furanoate)

In a 200 mL glass reactor were added 50.0 g of dimethyl-2,5-furanedicarboxylate (0.27 mol), 33.7 g of ethylene glycol (0.54 mol), and 0.07 g of titanium tetrabutoxide. The temperature was increased to 160° C. at a constant stirring of 150 rpm under nitrogen flow. The temperature was hold for 1 hour and then further increased to 190° C. The trans-esterification rate was estimated from the quantity of distillate collected. In the second step, the pressure was reduced to 5 mbar in 90 min and the temperature was gradually increased to 240° C. Low pressure conditions were maintained for 210 min.

The resulting polyester had a reduced viscosity of 33.0 mL/g (25° C., 5 g/L, Phenol: 1,2-dichlorobenzene (50:50)). The molar mass of the polymer was Mn=12 100 g/mol and Mw=47 200 g/mol with a PDI=3.9. The analysis by DSC gave a glass transition of the polymer at 85.3° C. The color parameters measured on the polymer pellets were L*=39.1, a*=2.1 and b*=17.2.

Scaled-Up Trials:

Example 2. Synthesis of poly(ethylene-co-isosorbide furanoate) Polyester According to the Invention In a 2 L stainless steel reactor were added 770 g of dimethyl-2,5-furanedicarboxylate (4.2 mol), 442 g of ethylene glycol (7.1 mol), 183 g of isosorbide (1.3 mol), 0.171 g of dibutyltin (IV) oxide, 0.183 g of Irgamod 195 and 0.05 g of sodium acetate. To exclude as much as possible residual oxygen from the reactor, four vacuum-nitrogen cycles were carried out between 60 and 80° C. at a constant stirring of 20 rpm. Then temperature was increased to 130° C. and the stirring was progressively increased to 150 rpm. The reaction mixture was then heated to 190° C. under 1.2 bar nitrogen pressure and stirred at a constant rate (150 rpm). The trans-esterification rate was estimated from the quantity of distillate collected. Then 0.484 g of titanium isopropoxyde were added in the reactor. In the second step, the pressure was reduced to 1 mbar in 90 min and the temperature was gradually increased to 240° C. Low pressure conditions were maintained for 235 min until the torque measured on the stirrer increased of 2.0 Nm. A polymer strand was then withdrawn from the bottom drain valve of the reactor and quenched in a water bath. PEIF pellets were then obtained after granulation.

The resulting polyester had a reduced viscosity of 38.7 mL/g (25° C., 5 g/L, Phenol: 1,2-dichlorobenzene (50:50)). The molar mass of the polymer was Mn=27 300 g/mol and Mw=50 950 g/mol with a PDI=1.9. The chemical analysis of the PEIF by NMR gave an isosorbide content of 14.4 mol % regarding to the diol content. The analysis by DSC gave a glass transition of the polymer at 94° C. The color parameters measured on the polymer pellets were L*=31.2, a*=4.5 and b*=17.8. $R_{P/F}$ was 0.93.

Example 3. Synthesis of poly(ethylene-co-isosorbide furanoate) Polyester According to the Invention In a 2 L stainless steel reactor were added 770 g of dimethyl-2,5-furanedicarboxylate (4.2 mol), 442 g of ethylene glycol (7.1 mol), 183 g of isosorbide (1.3 mol), 1.153 g of titanium tetrabutoxide, 0.183 g of Irgamod 195 and 0.05 g of sodium acetate. To exclude as much as possible residual oxygen from the reactor, four vacuum-nitrogen cycles were carried out between 60 and 80° C. at a constant stirring of 20 rpm. Then temperature was increased to 130° C. and the stirring was progressively increased to 150 rpm. The reaction mixture was then heated to 190° C. under 1.2 bar nitrogen pressure and stirred at a constant rate (150 rpm). The trans-esterification rate was estimated from the quantity of distillate collected. In the second step, the pressure was reduced to 1 mbar in 90 min and the temperature was gradually increased to 240° C. Low pressure conditions were maintained for 145 min until the torque measured on the stirrer increased of 1.3 Nm. A polymer strand was then withdrawn from the bottom drain valve of the reactor and quenched in a water bath. PEIF pellets were then obtained after granulation.

The resulting polyester had a reduced viscosity of 40.3 mL/g (25° C., 5 g/L, Phenol: 1,2-dichlorobenzene (50:50)). The molar mass of the polymer was Mn=37300 g/mol and Mw=60050 g/mol with a PDI=1.6. The chemical analysis of the PEIF by NMR gave an isosorbide content of 13.2 mol % regarding to the diol content. The analysis by DSC gave a glass transition of the polymer at 99° C. The color parameters measured on the polymer pellets were L*=30.8, a*=5.84 and b*=14.8. $R_{P/F}$ was 0.85.

Example 4. Synthesis of poly(ethylene-co-isosorbide furanoate) Polyester According to the Invention a 2 L stainless steel reactor were added 770 g of dimethyl-2,5-furanedicarboxylate (4.2 mol), 442 g of ethylene glycol (7.1 mol), 183 g of isosorbide (1.3 mol), 0.171 g of dibutyltin(IV) oxide, 0.183 g of Irgamod 195 and 0.05 g of sodium acetate. To exclude as much as possible residual oxygen from the reactor, four vacuum-nitrogen cycles were carried out between 60 and 80° C. at a constant stirring of 20 rpm. Then temperature was increased to 130° C. and the stirring was progressively increased to 150 rpm. The reaction mixture was then heated to 190° C. under 1.2 bar nitrogen pressure and stirred at a constant rate (150 rpm). The trans-esterification rate was estimated from the quantity of distillate collected. Then 0.484 g of titanium isopropoxide were added in the reactor. In the second step, the pressure was reduced to 1 mbar in 90 min and the temperature was gradually increased to 250° C. Low pressure conditions were maintained for 255 min until the torque measured on the stirrer increased of 4.2 Nm. A polymer strand was then withdrawn from the bottom drain valve of the reactor and quenched in a water bath. PEIF pellets were then obtained after granulation.

The resulting polyester had a reduced viscosity of 49.2 mL/g (25° C., 5 g/L, Phenol: 1,2-dichlorobenzene (50:50)). The molar mass of the polymer was Mn=33 050 g/mol and Mw=66 650 g/mol with a PDI=2.0. The chemical analysis of the PEIF by NMR gave an isosorbide content of 18.6 mol % regarding to the diol content. The analysis by DSC gave a glass transition of the polymer at 102° C. The color parameters measured on the polymer pellets were L*=30.2, a*=6.1 and b*=11.9. $R_{P/F}$ was 1.20.

Comparative Example 5. Synthesis of poly(ethylene-co-isosorbide terephthalate)

In a 2 L stainless steel reactor were added 872 g of dimethyl-terephthalate (4.5 mol), 450 g of ethylene glycol (7.2 mol), 187 g of isosorbide (1.3 mol), 0.285 g of titanium tetrabutoxide, 0.187 g of Irgamod 195 and 0.05 g of sodium acetate. To exclude as much as possible residual oxygen from the reactor, four vacuum-nitrogen cycles were carried out between 60 and 80° C. at a constant stirring of 20 rpm. Then temperature was increased to 160° C. and the stirring was progressively increased to 150 rpm. The reaction mixture was then heated to 230° C. under 1.2 bar nitrogen pressure and stirred at a constant rate (150 rpm). The trans-esterification rate was estimated from the quantity of distillate collected. In the second step, the pressure was reduced to 1 mbar in 90 min and the temperature was gradually increased to 270° C. Low pressure conditions were maintained for 100 min. A polymer strand was then withdrawn from the bottom drain valve of the reactor and quenched in a water bath. PEIT pellets were then obtained after granulation.

The molar mass of the polymer was Mn=22 400 g/mol and Mw=42 600 g/mol with a PDI=1.9. The chemical analysis of the PEIT by NMR gave an isosorbide content of 15.2 mol % regarding to the diol content. The analysis by DSC gave a glass transition of the polymer at 92° C.

Example 5. Synthesis of poly(ethylene-co-isosorbide furanoate) from Isosorbide Diester and Ethylene Glycol; Polyester According to the Invention In a flask isosorbide and dimethyl-2,5-furanedicarboxylate were mixed in a molar ratio of 1:2.1. As transesterification catalyst butyl-tin(IV)-tris(octoate) was added in an amount of 0.10 mol %, based on the amount of dimethyl-2,5-furanedicarboxylate. The reaction mixture was kept at 190° C. for 2.5 hrs under a nitrogen atmosphere. The resulting ester was a product wherein the two hydroxyl groups of isosorbide had reacted with dimethyl-2,5-furanedicarboxylate so that the isosorbide molecule contained two 5-methylcarboxylate-furan-2-carboxylate residues.

The ester product was split, mixed with different amounts of ethylene glycol, and placed in a film reactor. The resulting reaction mixtures were kept at 190° C. for two hours and then at 240° C. at a pressure of less than 1 mbar for 4 hours. The resulting polyesters were recovered. The amounts of ethylene glycol, expressed in molar amounts relative to the molar amount of isosorbide (EG/IS), and some properties of the resulting polyesters are listed in Table 1. IS percentage represents the relative molar amount of isosorbide to the sum of isosorbide and ethylene glycol in the product determined by $^1$H NMR spectroscopy; Mn is the number average molecular weight, determined via gel permeation chromatography using polystyrene standards; PDI is the polydispersity index, representing Mw/Mn; and Tg is the glass transition temperature, determined by DSC.

TABLE 1

| EG/IS | IS percentage (%) | Mn | PDI | Tg, (° C.) |
|---|---|---|---|---|
| 1.2 | 55.0 | 6570 | 1.99 | 126 |
| 1.6 | 43.2 | 5900 | 2.33 | 115 |
| 2.0 | 41.3 | 7000 | 2.40 | 111 |

Example 6. Synthesis of poly(ethylene-co-isosorbide furanoate) from Isosorbide Diester and Ethylene Glycol Oligomer; Polyester According to the Invention The reaction between isosorbide and dimethyl-2,5-furanedicarboxylate as described in Example 5 was repeated.

In a separate vessel ethylene glycol and dimethyl-2,5-furanedicarboxylate were mixed in a molar ratio of 2.5:1. As transesterification catalyst titanium(IV)tetraisopropoxide was used in an amount of 0.04 mol %, based on the amount of dimethyl-2,5-furanedicarboxylate. The reaction mixture was kept at 190° C. for 3 hrs under a nitrogen atmosphere. The resulting product contained an oligomer with an average degree of polymerization of 2.7.

In three experiments the isosorbide ester and the ethylene glycol oligomer were combined to mixtures with different ratios, wherein the ratios were calculated as the molar ratios of the amounts of isosorbide and ethylene glycol in their respective first reactions with dimethyl-2,5-furanedicarboxylate. The mixtures were first kept at 190° C. for 2 hrs under a nitrogen atmosphere. Subsequently, the resulting mixtures were kept at 240° C. for 4 hours under vacuum of less than 1 mbar.

The ratios of ethylene glycol to isosorbide in the initial mixture (EG/IS), and some properties of the resulting polyesters are listed in Table 2.

TABLE 2

| EG/IS | IS percentage (%) | Mn | PDI | Tg, (° C.) |
|---|---|---|---|---|
| 1.0 | 22.3 | 8430 | 2.23 | 101 |
| 1.7 | 14.7 | 11260 | 2.29 | 98 |
| 3.0 | 8.8 | 9180 | 2.33 | 90 |

The invention claimed is:

1. A process for the manufacture of polyester, wherein the process comprises:
   a stage of introduction, into a reactor, of monomers comprising at least one furandicarboxylic acid diester, at least one saturated diol and at least one bicyclic diol, in order to form a reaction medium;
   a stage of polymerization of the monomers in the presence of a catalyst, in order to form a polyester;
   a stage of recovery of the polyester on conclusion of the polymerization stage;
   wherein the (saturated diol+bicyclic diol)/diester molar ratio ranges from 1.7 to 2.6, wherein the saturated diol is ethylene glycol and wherein the said bicyclic diol is chosen from:

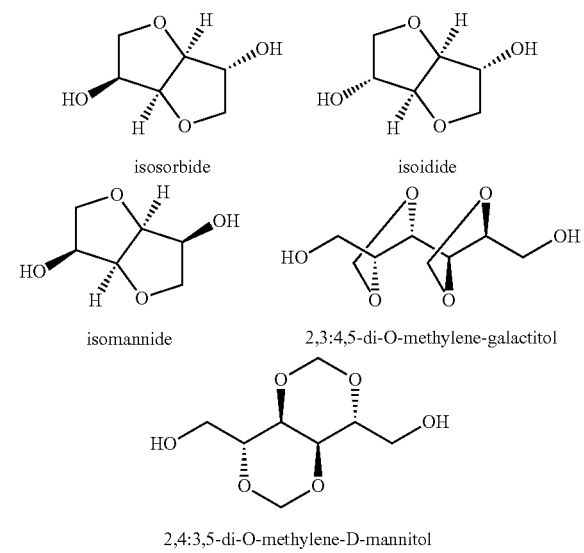

to yield said polyester with a glass transition temperature greater than or equal to 90° C.

2. The process according to claim 1, wherein, with respect to all of the moles of monomers introduced into the reactor, the molar percentage of furandicarboxylic acid diester ranges from 20% to 50%.

3. The process according to claim 1, wherein, with respect to all of the moles of saturated diol and bicyclic diol introduced into the reactor, at least 5 mol % and at most 99 mol % are composed of bicyclic diol.

4. The process according to claim 1, wherein the polymerization stage comprises:
   a first stage during which the reaction medium is stirred at a temperature ranging from 100 to 220° C., in order to form oligomers;
   a second stage during which the oligomers formed are stirred at a temperature ranging from 180 to 260° C., in order to form the polyester.

5. The process according to claim 4, wherein the first stage has a duration ranging from 1 to 5 hours and the second stage has a duration ranging from 2 to 6 hours.

6. The process according to claim 1 wherein the ratio between molar percentage of bicyclic diol units in the polymer and molar percentage of bicyclic diol in the reactor feed is higher than or equal to 0.85.

7. A process for preparing a polyester comprising:
   contacting at least one furandicarboxylic acid or diester, and one bicyclic diol chosen from:

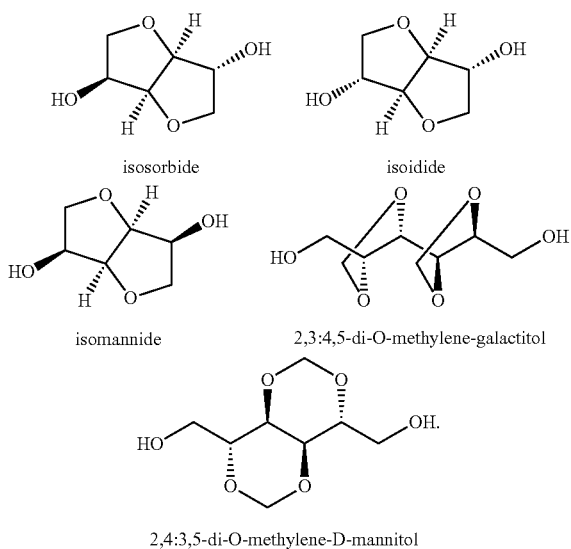

in order to form an ester product comprising an excess of furandicarboxylate moieties compared to bicyclic diol moieties; and
   reacting the ester product thus obtained with a saturated diol under polymerization conditions to form the polyester, wherein the saturated diol is ethylene glycol,
   to yield the polyester having a glass transition temperature greater than or equal to 90° C.

8. The process according to claim 7, wherein the molar ratio of bicyclic diol to furandicarboxylic acid or diester is in the range of 1:1.5 to 1:3.

9. The process according to claim 7, wherein the ester product is contacted with the saturated diol with 2 to 10 carbon atoms at a temperature in the range of 180 to 260° C., a pressure of less than 10 mbar, and a reaction period of 2 to 6 hours.

10. A process for preparing a polyester comprising:
    contacting at least one furandicarboxylic acid or diester, and one bicyclic diol chosen from:

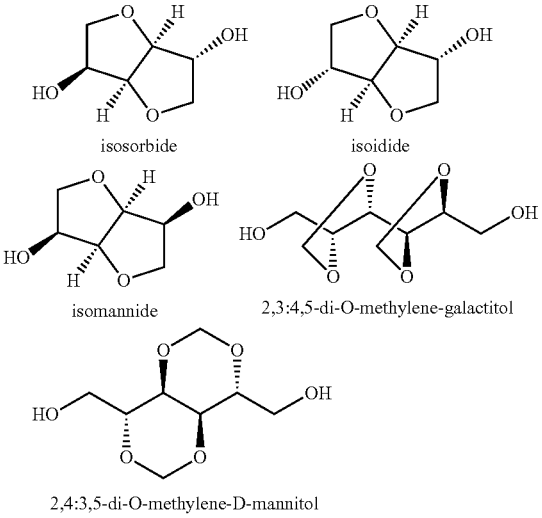

in order to form an ester product comprising an excess of furandicarboxylate moieties compared to bicyclic diol moieties;
    contacting at least one furandicarboxylic acid diester and one saturated diol, wherein the saturated diol is ethylene glycol to form an oligomer of furandicarboxylate units and saturated diol units wherein the saturated diol unit is an ethylene glycol unit; and
    reacting the ester product with the oligomer under polymerization conditions to form the polyester having the glass transition temperature greater than or equal to 90° C.

11. The process according to claim 10, wherein the molar ratio of saturated diol to furandicarboxylic acid or diester is in the range of 1:2 to 1:4.

12. The process according to claim 10, wherein the ester product of furandicarboxylate and bicyclic diol and oligomer are subjected to polymerization in two sub-steps.

13. The process according to claim 12, wherein in the first sub-step the ester product and the oligomer are contacted at a temperature in the range of 100 to 220° C.

14. The process according to claim 12, wherein in the second sub-step the product of the first sub-step is subjected to polycondensation at a temperature in the range of 180 to 260° C., a pressure of less than 10 mbar and a reaction period of 2 to 6 hours.

15. A polyester obtained by the process of claim 1.

16. A composition comprising the polyester according to claim 15 and at least one compound chosen from additives or polymers.

17. An article comprising the polyester according to claim 15.

18. A receptacle comprising the polyester according to claim 15.

19. A polyester obtained by the process of claim 7.

20. A composition comprising the polyester according to claim 19 and at least one compound chosen from additives or polymers.

21. An article comprising the polyester according to claim 19.

22. A receptacle comprising the polyester according to claim 19.

23. A polyester obtained by the process of claim 10.

24. A composition comprising the polyester according to claim 23 and at least one compound chosen from additives or polymers.

25. An article comprising the polyester according to claim 23.

26. A receptacle comprising the polyester according to claim 23.

* * * * *